Jan. 23, 1962  J. B. POLOMSKI  3,017,788
BRAKING SYSTEM
Filed June 8, 1951  2 Sheets-Sheet 1

Inventor:
John B. Polomski
By: Keith J. Blewer
Atty.

United States Patent Office 3,017,788
Patented Jan. 23, 1962

3,017,788
BRAKING SYSTEM
John B. Polomski, Detroit, Mich., assignor to Borg-Warner Corporation, Chicago, Ill., a corporation of Illinois
Filed June 8, 1951, Ser. No. 230,489
7 Claims. (Cl. 74—732)

My invention relates to transmissions for automotive vehicles and more particularly to automotive transmissions which include hydrodynamic coupling devices.

A transmission of this type may comprise a hydrodynamic device connected with the drive shaft of the transmission and means for completing a number of different ratio drive power trains between the hydrodynamic device and the driven shaft of the transmission. When one of these power trains is completed, there is a certain so called drag torque transmitted through the hydrodynamic device and transmission, assuming the vehicle engine to be in idling condition, which is generally sufficient to cause a slow movement or creep of the vehicle particularly when the oil and grease in the vehicle are warm due to previous operation of the vehicle. This is objectionable since the vehicle moves from standstill when the brakes and clutches are both released under which conditions the vehicle operator in general desires no vehicle movement. It is an object of the invention to provide an improved system for temporarily stopping movement of the driven shaft of the transmission and of the vehicle under engine idling conditions prior to depression of the vehicle accelerator for starting the vehicle by the operator.

More specifically, it is an object of the invention to provide a system for simultaneously completing two different power trains between the hydrodynamic device and the driven shaft of the transmission, so that the driven shaft is in effect locked from rotation and cannot be driven through the hydrodynamic device. It is contemplated that one of the power trains through which it is desired to start the vehicle is completed by a fluid pressure engaged friction engaging mechanism supplied with ample pressure to transmit the full driving torque through the transmission and that the other power train is also completed by means of a fluid pressure engaged friction engaging mechanism supplied with only a small portion of the pressure required for transmitting full driving torque through the transmission, so that when the vehicle is started by transmission of power through the former power path, the second mentioned friction engaging mechanism slips. It is also an object to provide speed controlled means for completely disengaging the last mentioned friction engaging mechanism to break the power train causing such a locking of the transmission driven shaft, and it is contemplated that this speed responsive means shall be effective for preventing such a simultaneous completion of the two power trains until the speed of the driven shaft of the transmission drops to a certain value.

Preferably, I cause the simultaneous completion of a forward drive power train and a reverse drive power train for counteracting drag torque under engine idling conditions, with the reverse drive power train being broken when forward movement of the vehicle begins; however, it is also within the purview of the invention to cause the simultaneous completion of any two other two-way drive power trains, such as two forward drive power trains of different speed ratio, for causing this same result. It is contemplated that the speed responsive means may simply include a pump driven by the driven shaft of the transmission and supplying fluid to a fluid pressure actuable spring pressed valve which is moved against the action of its spring when an appreciable fluid pressure is obtained from the pump.

The invention consists of the novel constructions, arrangements and devices to be hereinafter described and claimed for carrying out the above stated objects and such other objects as will be apparent from the following description of preferred embodiments of the invention, illustrated with reference to the accompanying drawings, wherein:

FIG. 1 comprising the two parts.

Like characters of reference designate like parts in the several views.

Referring now to the drawings, the transmission illustrated comprises a drive shaft 10 and a driven shaft 11. The drive shaft 10 is adapted to be driven by the engine 12 of the vehicle in which the transmission is installed, and the driven shaft 11 is adapted to drive the rear road wheels 13 of the vehicle through any suitable drive connections.

The transmission comprises in general a hydraulic torque converter 14, a planetary gear set 15, a second planetary gear set 16, a forward drive brake 17, a low speed lock-up brake 18, a reverse brake 19, a high speed forward drive clutch 20 and an intermediate speed clutch 21.

Figure 4:
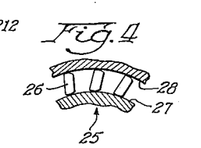

The hydraulic torque converter 14 comprises a bladed impeller 22, a bladed runner or driven element 23 and a bladed stator or reaction element 24. The impeller is connected to be driven from the drive shaft 10. The stator 24 is connected with a one-way brake 25 which is effective for holding the stator 24 against rotation in the reverse direction, that is, in the direction of rotation opposite to that of the drive shaft 10. The brake 25 may be of any suitable construction and may, for example, comprise tiltable sprags 26 disposed between and engageable with inner and outer cylindrical raceways 27 and 28 as shown in FIG. 4.

The planetary gear set 15 comprises a ring gear 29, a sun gear 30, a plurality of planet gears 31 in mesh with the sun and ring gears and a planet gear carrier 32 for the planet gears 31. The second planetary gear set 16 comprises a ring gear 33, a sun gear 34, a plurality of planet gears 35 in mesh with the sun and ring gears and a planet gear carrier 36. The ring gear 29 of the first planetary gear set is connected to be driven by the runner 23 of the torque converter 14, and the planet gear carrier 32 of this gear set is connected with the ring gear 33 of the second planetary gear set 16. The planet gear carrier 36 of the second gear set is connected with the driven shaft 11.

Figure 2:
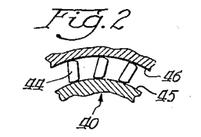
FIGS. 2, 3 and 4 are sectional views on enlarged scales taken respectively on lines 2—2, 3—3 and 4—4 in FIG. 1 in the directions indicated.
Figure 3:
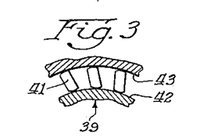

The friction brake 17 comprises a brake band 37 engageable with a drum 38, and the brake 17 is effective through a one-way brake 39 for braking the sun gear 34 and is effective through this one-way brake and a series connected, second one-way brake 40 for braking the sun gear 30 of gear set 15. The one-way brakes 39 and 40 may be of any suitable well-known construction and may be of the sprag type similar to the brake 25. The one-way brake 39 may comprise sprags 41 engageable with inner and outer cylindrical surfaces 42 and 43, and the brake 40 may comprise sprags 44 engageable between inner and outer cylindrical surfaces 45 and 46. Looking in the same direction at the brakes 39 and 40, the sprags of the two brakes are disposed in opposite directions between the respective inner and outer races as is apparent from FIG. 2 and 3.

The brake 18 comprises a brake band 47 engageable on a brake drum 48 for augmenting the braking action of the one-way brakes 39 and 40 and the friction brake 17 with respect to the sun gear 30. The friction clutch 21 comprises discs 49 rotatable with the planet gear carrier 32, discs 50 rotatable with the sun gear 30, opposite pressure plates 51 and 52, and a fluid pressure actuated piston 53 for moving the plate 52 toward the plate 51 to frictionally engage the two sets of friction discs with each other for engaging the clutch 21.

The reverse brake 19 comprises a brake band 54 engageable with a brake drum 55 which is connected with the carrier 32 of the planetary gear set 15 and with the ring gear 33 of the planetary gear set 16. The clutch 20 comprises a clutch disc 56 connected with the driven shaft 11, an axially movable pressure plate 57 having a fluid pressure actuated piston portion 58 and an axially stationary pressure plate 59, both plates being rotatable with the drive shaft 10 and engaging the disc 56 between them.

Each of the brakes 17, 18 and 19 is engaged by a fluid pressure actuated servo-motor, the brakes 17, 18 and 19 being respectively engaged by servo-motors 60, 61 and 62. The servo-motor 60 comprises a fluid pressure actuated piston 63 for engaging the brake band 37 on the drum 38; the servo-motor 61 comprises fluid pressure actuated pistons 64 and 65 for engaging the brake band 47 on the drum 48; and the servo-motor 62 comprises pistons 66 and 67 for engaging the brake band 54 on the drum 55. Return springs 68, 69 and 70 are provided in the motors 60, 61 and 62, respectively, for disengaging the bands from the drums.

In operation, the transmission provides low, intermediate and direct forward drives and a drive in reverse. The transmission is in a neutral condition when the clutches 20 and 21 and the brakes 17, 18 and 19 are all disengaged, and the shaft 11 is not driven from the shaft 10 when the latter is rotated by the engine 12. The low speed forward drive may be completed by engaging the brakes 17 and 18. The sun gear 34 is braked by means of the friction brake 17 and the one-way brake 39, and the sun gear 30 is braked by the friction brake 18 and the one-way brake 40 from the sun gear 34. The reaction on both of the sun gears 30 and 34 is in the reverse direction tending to rotate the sun gears in this direction, the reverse direction being opposite to the direction of rotation of the drive shaft 10, and the brake means including the one-way units 39 and 40 are so arranged to prevent such reverse rotation. The brake 18 augments the braking effect of the brake 17 on the sun gear 30 holding it against reverse rotation. For the low speed drive from the drive shaft 10 to the driven shaft 11, the forward brake drum 38 tends to rotate in the reverse direction indicated by the arrow 38a, and the low brake drum 48 tends to rotate in the reverse direction indicated by the arrow 48a, which cause the respective bands 37 and 47 to tend to wrap about the respective drums 38 and 48, carrying the ends of the bands acted on by the motors 60 and 61 along with the drums in the same direction in which the motors are operative to move these ends of the bands, for augmenting the braking effect that would otherwise be obtainable. The brake 18 functions to prevent rotation in the forward direction (opposite to the arrow 48a) of both the sun gears 30 and 34 which would be obtained under coast load when the driven shaft 11 tends to drive the drive shaft 10 through the transmission. The brake 18 functions in this manner on the sun gear 34 through the one-way device 40. The brake 18 thus assures that the low speed drive is a two-way drive, namely, the low speed power train is effective for driving either from the drive shaft 10 to the driven shaft 11 or vice versa. However, the tendency of the sun gears 30 and 34 and thereby of the brake drum 48 to rotate in the forward direction under coast load causes an unwrapping effect of the low brake band 47, that is, the drum 48 for this direction of rotation acts against and in a direction opposite to the effect of the motor 61 on the end of the band acted on by the motor 61 and thus the braking effect of the brake 18 is reduced for this tendency of rotation of the drum 48 as compared to the other direction. Furthermore, it will be noted that only the brake 18 is effective for a coast load from the driven shaft 11 to the drive shaft 10, instead of both the brakes 17 and 18, and the braking effect on the sun gears 30 and 34 is less for this reason also. Thus, the amount of torque that may be transmitted from the driven shaft 11 to the drive shaft 10 in low speed drive is much less for these two reasons alone than the torque that may be transmitted in the opposite direction.

The runner 23 of the torque converter 14 is driven through the medium of the fluid in the torque converter from the impeller 22 and the drive shaft 10, the runner being driven initially at a multiplied torque with respect to the torque impressed on the drive shaft 10 due to the action of the stator 24 which is held stationary by the one-way brake 25, and at the higher speeds of the runner 23, the device 14 functions as a simple fluid coupling with the impeller 22 and runner rotating at substantially the same speed and with the stator 24 being released by the one-way brake 25 and rotating along with the impeller and runner, all in accordance with well-known principles of operation of hydraulic torque converters. The runner 23 is connected with and drives the ring gear 29 of the gear set 15. The sun gear 30 of this gear set is braked to be stationary for low speed drive, as has just been described, and the planet gears 31 planetate between the sun gear 30 and ring gear 29 to drive the carrier 32 at a reduced speed and increased torque in the forward direction (in the same direction as the drive shaft 10 rotates). The ring gear 33 of the second planetary gear set 16 is connected with the carrier 32 and is driven thereby. The sun gear 34 of the gear set 16 is braked to be stationary as has just been described, and the planet gears 35 of this gear set planetate between the ring gear 33 and the sun gear 34 and drive the planet gear carrier 36 which is connected with the driven shaft 11 at a further reduced speed and increased torque in the forward direction. The driven shaft 11 is thus driven at an increased torque with respect to that impressed on the drive shaft 10, an increase in torque taking place in each of the hydraulic torque converter 14, the planetary gear set 15 and the planetary gear set 16.

Intermediate speed forward drive through the transmission is completed by disengaging the brake 18 and engaging the clutch 21. The clutch connects together the planet gear carrier 32 and the sun gear 30 of the planetary gear set 15 thereby locking up the gear set and causing all of its elements to rotate together as a unit. The ring gear 33 of the second planetary gear set 16 is thereby driven from the runner 23 at the same speed as the runner, and the speed of the driven shaft is thereby increased with respect to its speed in low speed forward drive, the speed reduction in intermediate speed drive between the runner 23 and the driven shaft 11 being by virtue of the planetating action of the planet gears 35 in the second planetary gear set 16. The brakes 17 and 39 take the reaction on the sun gear 34 which is in the reverse direction as in low speed forward drive.

Direct drive through the transmission is completed by engaging the clutch 20 which directly connects together the drive shaft 10 with the driven shaft 11. Both the clutch 21 and the brake 17 may be allowed to remain in engaged condition for this drive, and the one-way brake 39 overruns in this condition of the transmission.

Reverse drive is completed through the transmission by engaging the reverse brake 19. The brake 19 functions to hold stationary the planet gear carrier 32 of the gear set 15 and the ring gear 33 of the gear set 16 connected with the carrier 32. The ring gear 29 is driven as in low and intermediate forward drives through the hydraulic torque converter 14 from the drive shaft 10, and the sun gear 30 is thereby driven at a reduced speed and increased torque in the reverse direction through the intermediary of the planet gear pinions 31 held against planetary rotation about the centers of the shafts 10 and 11 by the brake 19. The sun gear 30 drives the sun gear 34 of the planetary gear set 16 through the one-way brake 40 which in this case functions as a clutch. The ring gear 33 of the gear set 16 being held stationary by the reverse brake 19 functions as the reaction element of the gear set 16 to drive the planet gear carrier 36 and thereby the driven shaft 11 in the reverse direction at a speed which is reduced below the speed of the sun gear 30 due to the action of the planet gear pinions 35 rotating within the ring gear 33. The reverse brake drum 55 tends to rotate in the forward direction indicated by the arrow 55a so that the band 54 tends to wrap around the drum and increase the braking effect for the reverse drive.

The control mechanism for the transmission comprises in general a pump 80 driven by the drive shaft 10 of the transmission, a pump 81 driven by the driven shaft 11 of the transmission, a manual selector valve 82, a direct drive ratio change valve 83, a front pump relief valve 84, a converter relief valve 85, a rear pump relief valve 86 and an anti-creep valve 87.

The drive shaft pump 80 comprises an inner gear 88 driven through the intermediary of the impeller 22 of the torque converter 14 from the drive shaft 10 and an outer gear 89 eccentrically located with respect to the inner gear and in mesh with the latter gear. A crescent shaped casing portion 90 separates the gears 88 and 89, as shown. The pump 80 is connected with an inlet conduit 91 and thereby with a fluid sump 92, and the pump is also connected with an outlet conduit 93. The pump is of well-known construction and operates as is well understood to pump fluid from the conduit 91 to the conduit 93 when the inner gear 88 is rotated in the direction indicated by the arrow on the gear, and the outer gear 89 rotates in the same direction due to its meshing engagement with the gear 88, the pumping action being due to the fluid carried by the gears 88 and 89 across the inner and outer faces of the crescent shaped casing portion 90.

The driven shaft pump 81 comprises a gear 94 driven by the driven shaft 11 and in mesh with a gear 95. The pump 81 is connected with an inlet conduit 96 which is arranged to draw fluid out of the sump 92, and the pump 81 is also connected with an outlet conduit 97.

The outlet conduit 93 of the drive shaft pump 80 is connected with the front pump relief valve 84, as shown. The valve 84 comprises a valve piston 98 slidably disposed in a cylindrical cavity 99 and having an enlarged end portion 100 slidably disposed in a cylindrical cavity 101 connected with the cavity 99. A cylindrical cavity 102 is connected with a cavity 101, and a piston 103 is slidably disposed in the cavity 102. A spring 104 is disposed between the piston 103 and the enlarged end portion 100 of the piston 98. The valve 84 is provided with ports 105, 106 and 107 opening into the cylindrical cavity 99, a port 108 opening into the cylindrical cavity 101 and a port 109 opening into the cylindrical cavity 102. The port 105 is connected with the conduit 93 so that fluid under pressure from the front pump 80 is applied to the end 110 of the piston 98. The port 107 is connected by means of a conduit 111 with the inlet conduit 91 for the pump 80, and the port 109 is connected by means of a conduit 112 with the servomotor 62 for the reverse brake 19.

The outlet conduit 93 of the front pump 80 is also connected with the rear pump relief valve 86. The valve 86 comprises a piston 113 having lands 114, 115 and 116 of the same diameter slidably disposed in a cylindrical cavity 117 and having a portion 118 of reduced diameter slidably disposed in a cylindrical cavity 119 connected with the cavity 117. The reduced diameter portion 118 is provided with a groove 120 therein. A spring 121 is provided between an end of the valve 113 and the adjacent end of the cavity 117. The cavity 117 is provided with ports 122, 123, 124, 125, 126, 127, 128, 129 and 130 and the cavity 119 is provided with ports 131, 132, 133 and 134. The ports 122, 133 and 134 are exhaust ports through which fluid may freely discharge into the sump 92; the port 124 is connected with the front pump discharge conduit 93; the port 125 is connected with a conduit 135 which is connected with the port 106 of the valve 84 at its other end; the port 129 is connected with the rear pump discharge conduit 97; and the port 132 is connected with a conduit 136 which is connected at its other end with the port 108 in the valve 84.

The manual selector valve 82 comprises a piston 137 having lands 138, 139, 140, 141 and 142 and is slidably disposed in a cylindrical cavity 143. The land 141 is provided with a plurality of grooves 144, 145, 146, 147 and 148 each adapted to receive a detent ball 149 acted on by a spring 150 for yieldably holding the valve piston 137 in various adjusted positions. The piston 137 is connected by means of a link 151 with a selector lever 152 located beneath the steering wheel 153 of the automotive vehicle in which the transmission is installed. The valve 82 is provided with ports 154, 155, 156, 157, 158, 159, 160, 161 and 162. The port 154 is connected by means of a conduit 163 with the conduit 112 and the reverse brake servo-motor 62 for applying fluid pressure to the ends of the pistons 67 and 66; the port 155 is connected by means of a conduit 164 with the ports 123, 128 and 131 in the valve 86; the ports 156 and 160 are connected by means of a conduit 165 with the forward brake servo-motor 60 for applying pressure behind the piston 63; the port 158 is an exhaust port adapted to freely discharge fluid into the sump 92; the port 159 is connected by means of a conduit 166 with the low brake servo-motor 61 for applying fluid pressure behind the pistons 64 and 65; and the port 161 is connected by means of a conduit 167 with the port 126 in the valve 86.

The converter relief valve 85 comprises a valve piston 168 slidably disposed in a cylindrical cavity 169. A spring 170 is disposed between the upper end of the piston 168 and the adjacent end of the cavity 169. The cavity 169 is provided with ports 171, 172 and 173. The port 171 is connected with the port 127 in the valve 86 and by means of a conduit 174 with the hydraulic torque converter 14 for the purpose of supplying fluid to the torque converter. The port 172 is connected with the rear pump discharge conduit 96; and the port 173 is an exhaust port adapted to freely discharge fluid into the sump 92.

The anti-creep valve 87 comprises a valve piston 175 having lands 176 and 177 and disposed in a cylindrical cavity 178. A spring 179 is provided between the land 176 and the adjacent end of the cavity 178. The cavity 178 is provided with ports 180, 181, 182, 183 and 184. The ports 180 and 181 are exhaust ports adapted to freely discharge fluid into the sump 92; the port 182 is connected with the conduit 163; the port 183 is connected with the port 162 in the valve 82 by means of a passage 185; and the port 184 is connected by means of a conduit 186 with the port 130 in the valve 86.

The direct drive ratio change valve 83 comprises a valve piston 187 having lands 188, 189 and 190, and the valve piston is slidably disposed in a cylindrical cavity 191. The cavity 191 is provided with ports 192, 193, 194 and 195. The port 192 is connected by means of a conduit 196 with the port 157 in the valve 82; the port 193 is connected by means of a conduit 197 with the piston 53 for the clutch 21; the port 194 is connected by means of a conduit 198 with the piston 57 for the direct drive clutch 20; and the port 195 is a bleed port adapted to freely discharge into the sump 92. It will be understood that the connections with the clutches 20 and 21, the parts of which are rotatable, are made by any suitable ports and ducts through and between the rotating shafts of the transmission in the actual transmission, which is only diagrammatically shown in the figure, in accordance with the usual expedients well-known to those skilled in the art.

A flyball type governor 199 is provided for actuating the valve piston 187. The governor 199 comprises flyballs 200 connected by links 201 with hubs 202 and 203 which have a spring 204 disposed between them and are splined to a shaft 205. The shaft 205 is driven through any suitable gearing 206 to rotate in accordance with the speed of the driven shaft 11 of the transmission. The hub 202 has a groove 207 provided therein for receiving an arm 208 fixed to the valve piston 187. The hub 203 is provided with a groove 209 for receiving one end of a lever 210 actuated on its other end by means of a link 211. The link 211 is controlled by the vehicle accelerator 212 also connected with the usual throttle lever and carburetor for the vehicle engine 12 by means of any suitable well-known connections (not shown).

A relief valve 213 is provided for the rear pump discharge conduit 97, the valve comprising a ball 214 adapted to rest on a seat 215 and held thereon by means of a spring 216. A relief valve 217 is provided for the hydraulic torque converter 14 and comprises a ball 218 adapted to rest on a seat 219 and yieldably held thereon by means of a spring 220.

In operation of the control system, the front pump 80 initially supplies the fluid pressure necessary for completing a drive through the transmission. The pump 80 is driven from the shaft 10 through the impeller 22 of the converter and thus is operative whenever the vehicle engine 12 is operative. The gears 88 and 89 are driven from the engine and draw fluid from the sump 92 through the inlet conduit 91 and discharge it into the discharge conduit 93 for the pump. The fluid within the discharge conduit 93 is effective on the end 110 of the valve piston 98 and moves the piston 98 against the action of the spring 104 so that excess fluid from the pump 80 is metered into and is discharged into the conduit 135, the valve piston 98 functioning to maintain the fluid in the conduit 93 at some predetermined value, such as 80# per sq. in. If the pressure is below this value, the piston will completely close the port 106 while if the pressure tends to increase above this value, the piston 98 will be moved to more fully open the port 106 to reduce the pressure to this value. Under neutral and forward driving conditions of the vehicle, the piston 103 is in its illustrated position resting against one end of the cavity 102.

The fluid discharged through the conduit 135 flows through the port 125 in the valve 86 between the lands 115 and 116, the port 127, and the port 171 of the converter relief valve 85 and is impressed on the piston 168 of this valve. This fluid pressure is impressed through the conduit 174 on the torque converter 14, and part of it flows through the torque converter and through the relief valve 217. The relief valve 217 is set to open at some low pressure, such as, for example 5# per sq. in. at which time the ball 218 moves against the action of the spring 220 off the seat 219. The fluid that flows through the converter and the valve 217 is discharged from the latter to lubricate certain working surfaces of the transmission and eventually bleeds into the sump 92. The valve 217 assures that all of the fluid within the torque converter 14 is not drained therefrom when the pump 80 and engine 12 are not in operation. The fluid flow that may pass through the valve 217 is restricted, and the fluid pressure within the torque converter 14 is determined by the converter relief valve 85, the piston 168 of which is moved upwardly against the action of the spring 170. The valve piston 168 in this upward movement opens the port 172 to meter fluid flow through this port, and also maintains the fluid pressure within the conduit 174 and in the torque converter 14 at a predetermined value, such as 27# per sq. in. The valve piston 168 in metering fluid flow through the port 172 is similar in action to the valve piston 98 in metering flow through the port 106 in maintaining a predetermined high pressure in the conduit 93. The excess fluid from the port 172 is discharged into the intake conduit 96 for the driven shaft pump 81, and, if it is not needed in supplying fluid to the pump 81, it flows through the conduit 96 back into the sump 92. The valve piston 113 of the valve 86, when the vehicle is stationary and there is no fluid discharged from the driven shaft pump 81 or when the fluid from the pump 81 is at a low pressure, is in its illustrated position in which the ports 125 and 127 are connected by the groove between the lands 115 and 116.

The fluid under pressure discharged from the pump 80 and regulated by the valve 84 is supplied to the manual selector valve 82 from the conduit 93, through the ports 124 and 123 connected by the groove between the lands 114 and 115, and the conduit 164; however, with the selector valve piston 137 in its illustrated neutral or "N" position, the valve land 138 closes the port 155 of the conduit 164, and the fluid pressure is not available for engaging any of the clutches and brakes of the transmission. The torque converter 14 is supplied with fluid under pressure regulated by the converter valve 85 in the neutral condition of the transmission and controls, as has been previously explained. The clutch 20 is disengaged, having its piston 57 drained of fluid through the conduit 198, the port 194, the groove between the lands 189 and 190 in the direct drive valve 83 and the exhaust port 195. The clutch piston 53 for the clutch 21 is drained of fluid, being connected by means of the conduit 197, the port 193 in the valve 83, the groove between the lands 188 and 189, the port 192, the conduit 196, the port 157 in the selector valve 82, the groove between the lands 138 and 139 and the exhaust port 158. The forward brake servo-motor 60 is drained through the conduit 165, the port 156 in the selector valve 82, the groove between the lands 138 and 139 and the exhaust port 158. The low speed brake servo-motor 61 is drained through the conduit 166, the port 159, the groove between the lands 139 and 140 of the selector valve 82, the port 160, the port 156, the groove between the lands 139 and 138, and the exhaust port 158. The reverse brake servo-motor 62 is drained by means of the conduit 163 and the port 154 connected with an open end of the cylinder 143 for the selector valve 82.

For ordinary forward driving, the selector valve piston 137 is shifted into its drive range or "D" position by means of a similar movement of the selector lever 152. In this position of the selector valve piston 137, the groove between the lands 138 and 139 connects the ports 155, 156 and 157 so that regulated pump pressure in the conduit 164 is supplied through the port 156 and conduit 165 to the forward brake servo-motor 60, and regulated pump pressure is supplied through the port 157 and conduit 196 to the direct drive ratio changing valve 83. The fluid pressure supplied to the valve 83 flows through the ports 192 and 193 and between the lands 188 and 189, and through the conduit 197 to the clutch piston 53 for engaging the clutch 21. The piston 187 of the valve 83 is illustrated in a position corresponding to no or slow movement of the vehicle. The fluid under pressure supplied to the servo-motor 60 is applied on the piston 63 to engage the brake band 37 on its drum 38 against the action of the spring 68, and the engagement of the clutch 21 and brake 17 complete the intermediate speed forward drive power train between the shafts 10 and 11.

Ordinarily a completion of a forward drive power train through a transmission of the type above described including a hydrodynamic coupling device causes a transmission of a sufficient amount of power due to the "drag torque" transmitted through the hydrodynamic device to cause the vehicle to creep or move slowly ahead with the vehicle engine idling and the accelerator in a closed throttle position, and it is necessary for the vehicle operator to apply the vehicle brakes for holding the vehicle stationary. In order to overcome this difficulty, the illustrated transmission control system advantageously includes means for causing an application of the reverse brake 19 with a pressure which is reduced with respect to the pressure applied when the driver wishes to drive the vehicle in the reverse direction. This application of the reverse brake 19 completes the reverse drive power train through the transmission, and since the forward drive power train has previously been completed by moving the valve piston 137 into its "D" position, the driven shaft 11 of the transmission is locked, so that no torque is transmitted through the transmission and to the driving road wheels of the vehicle. There is thus no tendency for the vehicle to creep even though the transmission is conditioned for forward intermediate speed drive.

The means for preventing such creeping of the vehicle includes the anti-creep valve 87. A connection is completed through this valve from the passage 135 and ports 125 and 126 in the rear pump relief valve 86 which contain fluid under the reduced pressure for the hydraulic torque converter 14. The valve piston 113 is in its illustrated position when the selector valve 137 is first put into its "D" position and the vehicle is substantially at a standstill, and the ports 125, 127 and 126 are connected by means of the groove between the lands 115 and 116 of the valve piston 113. The reduced pressure in the conduit 135 is thus applied to the reverse brake servo-motor through the conduit 167, the groove between the lands 141 and 142 on the selector valve piston 137, the port 162, the conduit 185, the port 183, the groove between the lands 176 and 177 on the anti-creep valve piston 175, the port 182 and the conduit 163. This reduced fluid pressure thus applied to the pistons 67 and 66 of the reverse brake servo-motor 62 causes a limited application of the reverse brake 19 and completion of the reverse drive power train concurrent with the intermediate forward drive power train, and the driven shaft 11 of the transmission is thus locked against forward rotation through the intermediate speed power train of the transmission when the vehicle engine 12 is in idling condition.

Figure 1A:
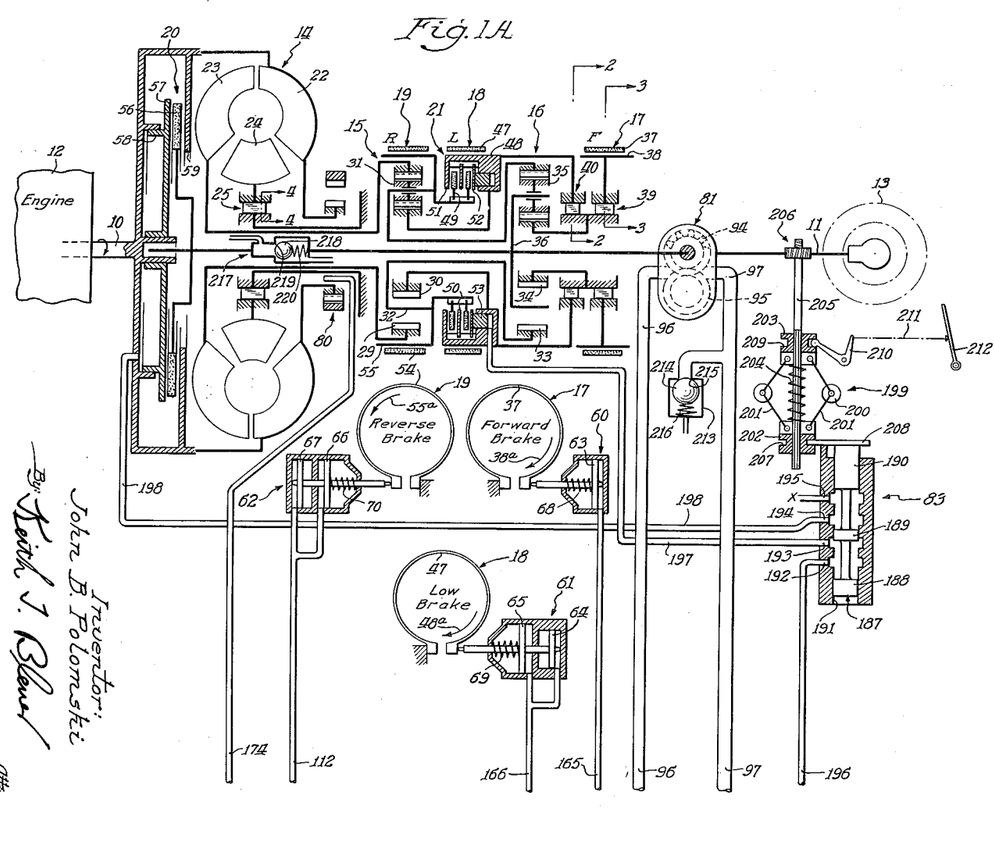
FIGS. 1A and 1B, shows a diagrammatic illustration of a transmission and a control system embodying the principles of the invention (FIG. 1A should be placed above FIG. 1B, with the correspondingly numbered conduits being connected, to form the complete FIG. 1)

The anti-creep valve 87 functions to cause a disengagement of the reverse brake 19 when the vehicle begins to move forwardly. Since the application of the reverse brake 19 is with a reduced pressure (the pressure supplied to the torque converter 14), an increasing in speed of the vehicle engine 12 by a depression of the vehicle accelerator 212 causes sufficient torque to be transmitted through the hydraulic torque converter 14 so that the driven shaft 11 and thereby the vehicle begin to move in the forward direction through the intermediate speed power train of the transmission, and the reverse brake 19 slips under its application by reduced pressure. When the driven shaft 11 begins rotation, the driven shaft pump 81 draws fluid from the sump 92 through the intake conduit 96 and discharges it into the conduit 97, and the fluid pressure in the conduit 97 increases as the vehicle speed increases. The fluid pressure in the conduit 97 is applied to an end of the piston 175 of the anti-creep valve, the connection being from the conduit 97 through the port 129 of the valve 86, the cylinder 117, the port 130, the conduit 186, and the port 184. When the vehicle has started moving and has increased in speed to approximately 3 to 5 miles an hour, the fluid pressure in the conduit 97 and those connected therewith has increased sufficiently to move the piston 175 to the left as seen in FIG. 1 against the action of the spring 179 so as to connect the ports 182 and 181 by the groove between the lands 176 and 177 of the valve piston 175 and to block the port 183 supplying fluid under converter pressure. The connection of the ports 182 and 181 causes a disengagement of the reverse brake 19 by draining the reverse brake servo-motor 62 through the conduits 112 and 163 and the ports 182 and 181. The reverse brake 19 is then completely disengaged by the retractor spring 70, and the vehicle proceeds in intermediate speed forward drive.

The purpose of the relief valve 213 is to allow a slow drainage out of the conduit 97 and to lubricate various parts of the transmission connected therewith. The ball 214 is held off its seat 215 against the action of the spring 216 for all substantial fluid pressures in the conduit 97 and when the pump 81 and shaft 11 are stationary, any residual pressure in the conduit 97 which would tend to hold the valve piston 175 in fluid pressure actuated position is drained, so that the piston 175 may return to its deenergized position. The pressure in the conduit 97, on increasing, moves the valve 113 against its spring 121 as will be described, and the relief valve 213 similarly allows the valve 113 to return to its deenergized position.

The direct drive piston 187 is shifted to a direct drive position by means of the governor 199. As the shaft 205 and thereby the flyballs 200 increase in speed, the flyballs move outwardly against the action of the spring 204, moving the hubs 202 and 203 together and thereby moving the valve 187 upwardly through the intermediary of the arm 208. In its upward direct drive position, the valve piston 187 connects the ports 192, 193 and 194 by means of the groove between the lands 188 and 189. The actual speed of the driven shaft 11 and of the vehicle at which the flyballs 200 move outwardly sufficiently to move the piston 187 into its direct drive position is changed and reduced with throttle opening by means of the connection between the hub 203 and the accelerator 212. As the accelerator 212 is moved toward an open throttle position it acts through the link 211 and lever 210 to move the hub 203 downwardly on the shaft 205. The direct drive shaft piston 187 in its direct drive position supplies fluid pressure to the piston 57 for the clutch 20, the fluid pressure supply conduit 196 being connected with the conduit 198 to the clutch piston 57 through the ports 192 and 194 and the groove between the lands 188 and 189 on the piston 187. The direct drive clutch 20 is thus engaged, and the direct drive power train is completed.

The rear pump relief valve 86 functions to cause the front pump relief valve 84 to become inoperative to maintain the fluid discharged from the front pump 80 at any particular increased pressure, and the valve 86 regulates the fluid pressure output of the driven shaft pump 81 to a predetermined maximum and supplies it to the selector valve 82 for engaging the various brakes and clutches and maintaining them engaged, when the speed of the vehicle has increased sufficiently. As the vehicle speed increases, the pressure of the fluid in the discharge conduit 97 for the driven shaft pump 81 increases, and this increasing fluid pressure is impressed on the face 116a of the land 116 on the rear pump relief valve piston 113. This increasing pressure causes the piston 113 to move to the left against the action of the spring 121 to a regulating position so as to connect the ports 131 and 132 by means of the groove 120 in the piston 113. This same movement of the piston 113 provides a connection, between the land 116 and the adjacent end of the cavity 117, of the ports 130, 128, 129 and 127. The port 127 constitutes a discharge port for the fluid from the driven shaft pump 81, and the land 116 cracks the port 127 only sufficiently to maintain the pressure in the conduit 97 and connected conduits at a predetermined maximum of 80 lbs. per sq. in. in one embodiment of the invention which is the same pressure that was maintained in the conduit 93 by the front pump relief valve 84, and the regulating action between the land 116 and the port 127 in the valve 86 is substantially the same as that between the end 110 of the valve piston 84 and the port 106 as has been previously described, the spring 121 being calibrated so as to obtain this predetermined maximum fluid pressure in the conduit 97. The conduit 97, which is the discharge conduit for the pump 81, is now connected with the conduit 164 through the port 128, and the driven shaft pump 81 now supplies the fluid to the selector valve 82 for maintaining the various clutches and brakes engaged.

The conduit 164 under these conditions is connected through the port 131, the groove 120, the port 132, the conduit 136 and the port 108 so as to apply the regulated fluid pressure in the conduit 164 to the enlarged end portion 100 of the valve piston 98, and the valve piston 98 is moved to the right against the action of the spring 104 by this pressure so as to open the port 107 with respect to the port 105, and the front pump 80 thereafter simply circulates fluid through the conduits 93 and 111 against substantially no pressure. The front pump 80 is thereby substantially unloaded, and the driven shaft pump 81 provides the fluid pressure necessary for operation of the transmission. In the regulating position of the valve piston 113, the land 115 blocks communication between the port 123 having regulated fluid pressure therein and the port 124 connected with the discharge conduit 93 of the pump 80.

For low speed forward drive through the transmission, the selector valve piston 137 is moved into its "L" position in which the ports 156 and 155 are connected by means of the groove between the lands 138 and 139 and the ports 159 and 160 are connected by means of the groove between the lands 140 and 141. Regulated fluid under pressure exists within the conduit 164 connected with the port 155 due to the functioning of the front pump 80, and this regulated fluid pressure is supplied through the ports 155 and 156, and the conduit 165 to the forward brake servo-motor 60 for engaging this brake, and this fluid pressure is supplied from the conduit 165 through the ports 159 and 160, and the conduit 166 to the low brake servo-motor 61 for engaging the low brake 18. Low speed forward drive through the transmission is thus completed. The reverse brake 19 is at first supplied with reduced pressure for preventing creeping for this drive as well as in intermediate speed drive as has been above explained, and as the vehicle speed increases, the valve 87 is first moved to disengage the reverse brake, and, later, with a further increase in vehicle speed, the rear pump relief valve 86 is moved to rear pump regulating position, as has been above described in connection with intermediate speed drive.

For reverse drive, the selector valve piston 137 is moved into its "R" position in which it connects the ports 155 and 154 by means of the groove between the lands 138 and 139 and it blocks the ports 162 and 161 by land 142. Regulated fluid pressure exists in the conduit 164 connected with the port 155 from the front pump 80, and, for reverse drive, the rear pump 81 rotates in the reverse direction and supplies no fluid pressure to the conduit 96. The fluid pressure in the conduit 164 is supplied through the ports 155 and 154 to the conduit 163 and thereby to the reverse brake servo-motor 62 in which the fluid under pressure is applied to the pistons 66 and 67 which function to engage the reverse brake 19 against the action of the return spring 70. The reverse drive power train is thus completed through the transmission. Since the driven shaft pump 81 supplies no pressure for reverse drive, the rear pump relief valve 86 remains in its illustrated position, and the selector valve piston 137 blocks any fluid flow from the conduit 163 connected with the reverse brake servo-motor to the rear pump relief valve 86.

The piston 103 in the front pump relief valve, as has been described, is connected by means of the conduit 112 with the reverse brake servo-motor 62, and the fluid pressure applied to this servo-motor thus moves the piston 103 to the left against the action of the spring 104 thereby strengthening the spring with respect to the front pump relief valve 98. This strengthening of the spring action makes it necessary for a greater pressure from the pump 80 to build up before the end 110 of the valve 98 can reach the exhaust port 106 for its regulating action, and the fluid pressure discharged from the pump 80 is thus maintained at a higher value for reverse drive (such as 200 lbs. per sq. in.) than that utilized in the forward drives, this increased pressure being for the purpose of assuring a tight engagement of the reverse brake 19. The pressure in the conduits 135 and 174 is maintained at a lower pressure, such as 27 lbs. per sq. in., by the converter relief valve 85 in the same manner as has been previously described for the forward drives.

My improved transmission control system advantageously completes two different power trains between the hydraulic torque converter 14 and the driven shaft 11 when the transmission is conditioned by means of the selector valve 82 in either drive range or low range. When the selector valve 82 is in its "D" or drive range position, the second speed forward drive power train and also the reverse drive power train are simultaneously completed between the converter 14 and the driven shaft 11 so that the driven shaft cannot rotate and cause the car to creep under vehicle engine idling conditions due to power transmitted through the hydraulic torque converter 14. When the selector valve 82 is in its "L" or low speed position, the low speed power train is completed by the brakes 17 and 18, and the reverse drive power train is simultaneously completed by means of the brake 19, and the same result is attained. The anti-creep valve 87 is actuated by means of fluid discharged from the driven shaft pump 81 which acts as a driven shaft speed responsive governor shifting the anti-creep valve so as to disapply the reverse brake and break the reverse drive power train when the vehicle starts in the forward direction. The pressure applied to the reverse brake 19 is substantially less than that applied to it for completion of the reverse drive through the transmission, and the brake 19 thus slips when the transmission starts to drive the vehicle in the forward direction, with the valve 82 being either in its "D" or "L" position.

Figures 1B, 5:
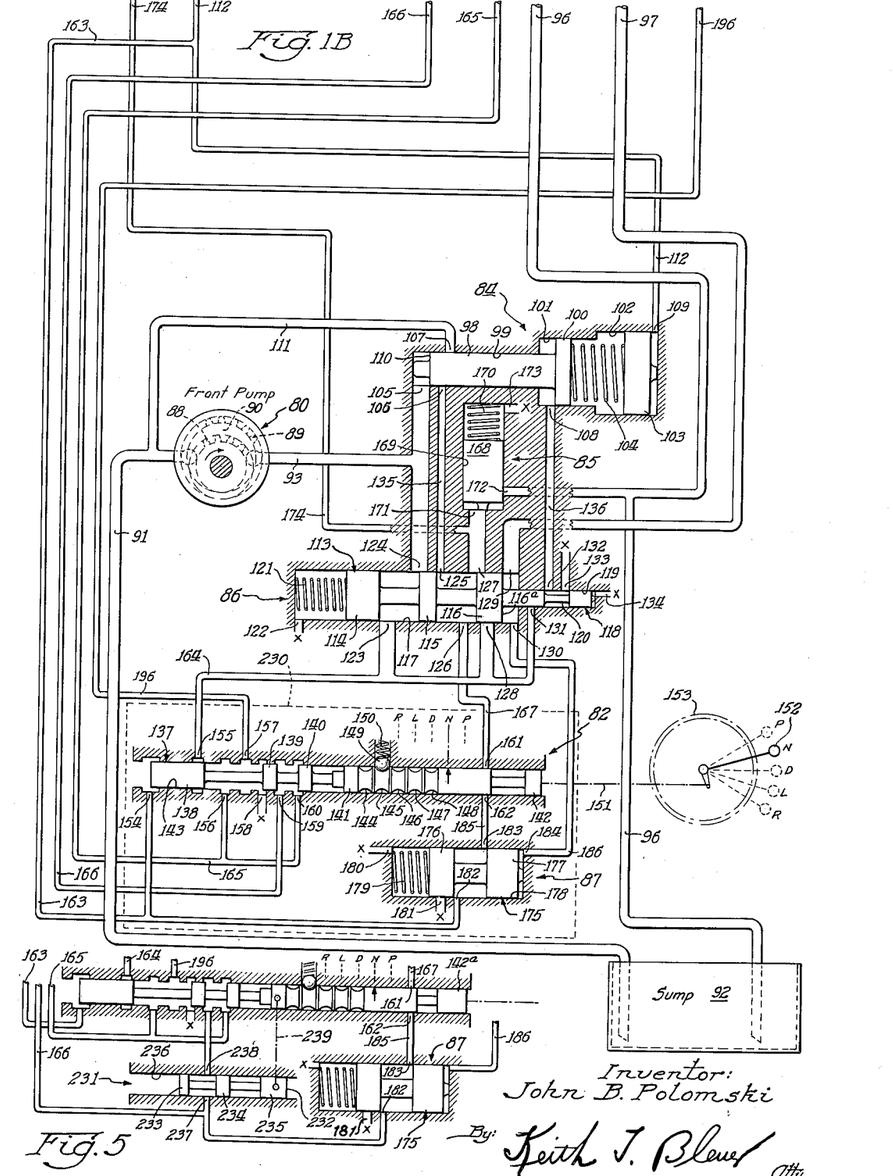
FIG. 5 is a diagrammatic illustration of a portion of a modification of the transmission control system, the FIG. 5 illustration to be substituted for the portion of the FIG. 1 control system bounded by dotted lines, with the correspondingly numbered conduits being connected, for forming a complete modified control system.

The modified form of the transmission controls, a portion of which is illustrated in FIG. 5, is the same as the controls shown in FIG. 1 except that the showing of FIG. 5 is substituted for the portion of the FIG. 1 control system within the dotted line enclosure 230 in FIG. 1, with the correspondingly numbered conduits in FIG. 5 and FIG. 1 being connected. The difference between the FIG. 5 disclosure and the original FIG. 1 disclosure lies primarily in three changes, namely: (1) the land 142 in the selector valve piston 137 is lengthened and is designated as land 142a in FIG. 5; (2) the port 182 of the anti-creep valve 87 is connected to the conduit 166 instead of to the conduit 163; and (3) a secondary selector valve 231 is disposed in the conduit 166 between the point of connection to the port 182 and the selector valve port 159.

The elongated land 142a in FIG. 5 allows a connection of the ports 161 and 162 only in the "D" or drive range position of the selector valve piston 137 and not in the "L" or low range position of the selector valve piston as was the case with the land 142 in FIG. 1.

As has been described in connection with FIG. 1, the fluid under reduced pressure supplied for anti-creep purposes was available for both low range and high range drive while, with the FIG. 5 showing, this fluid pressure is available only for driving in drive or high range, in which, incidentally, most forward driving is done.

The conduit 166 is connected with the servomotor 61 for the low brake 18, and this conduit and thereby the servo-motor 61 are supplied with the reduced fluid pressure from the anti-creep valve 87, which was formerly supplied to the conduit 163 and reverse brake servo-motor 62. The low brake 18 functions to complete a two-way drive through the low speed forward train, and this power train is thus simultaneously completed with the intermediate speed power train due to the functioning of the anti-creep valve 87 for preventing vehicle creep, whenever the selector valve 82 is in its "D" position and the vehicle is stationary, as will be hereinafter described more in detail.

The secondary selector valve 231 comprises a valve piston 232 having lands 233, 234 and 235, and the piston is slidably disposed in a cylindrical cavity 236. The cavity is provided with ports 237 and 238 connected with the conduit 166 so as to dispose the valve 231 in series with the conduit 166. The valve piston 232 is connected by any suitable means such as a link 239 with the valve piston 137 so that the valve piston 232 moves along with and has the same travel as the piston 137. The valve 231 functions when the selector valve piston 137 is in its "D" position to block the conduit 166 with respect to the port 159 and allows free flow through the conduit 166 to and from the port 159 for all other positions of the selector valve piston 137.

When the selector valve piston 137 is in its "D" position, the intermediate speed forward drive power train through the transmission is completed as has been hereinabove described. Under these conditions, assuming the vehicle to be stationary, the low brake 18 is simultaneously applied for simultaneously completing the low speed forward drive power train, and the simultaneous completion of both of these power trains functions to hold the driven shaft 11 stationary and to prevent creeping of the vehicle regardless of the drag torque transmitted through the hydraulic torque converter 14. The groove between the lands 141 and 142a in the selector valve piston 137 connects the ports 161 and 162 in the "D" position of the selector valve piston 137, and the reduced fluid pressure within the conduit 167, when the driven shaft 11 is stationary, is supplied through the conduit 185, the port 183, the groove between the lands 177 and 176 of the anti-creep valve 87, the port 182 and the conduit 166 to the low brake servo-motor 61, and the low brake 18 is thus applied to complete the two-way low speed drive through the transmission. The low brake 18 is applied with a reduced pressure corresponding to the pressure in the conduit 167 which is reduced with respect to the pressures used on the servo-motor 61 for completing the low speed power train for a drive from the drive shaft 10 to the driven shaft 11. The land 234 of the secondary selector valve 231 blocks the ports 237 and 238 preventing any of the fluid from the port 182 of the anti-creep valve 87 from draining through the selector valve 82. The simultaneous completion of the low speed forward drive power train with the intermediate speed forward power train locks the shaft 11 against rotation from drag torque transmitted through the hydraulic torque converter 14, and the vehicle therefore cannot creep.

When the vehicle accelerator 212 is subsequently depressed to open the engine throttle, power transmitted through the intermediate speed power train causes the driven shaft 11 to commence to rotate and a consequent forward motion of the vehicle. The low brake 18 slips under these conditions, with the brake drum 48 rotating within the band 47, and when the vehicle begins to move forwardly and reaches a certain low speed, such as for example, 3 or 4 miles per hour, the output pressure of the pump 81 has increased to move the valve piston 175 to the left against the action of the spring 179 to connect the ports 181 and 182, thereby venting the conduit 166 and the low brake servo-motor 61 for causing disengagement of the low brake 18. The vehicle is then driven without restriction of the low brake in intermediate speed forward drive. The anti-creep valve 87 functions to cause disengagement of the low brake 18 in the same manner as the reverse brake 19 was disengaged in the FIG. 1 embodiment of the transmission controls.

In connection with the low brake 18 it should be noted that this brake itself, exclusive of the brake 17, is effective to complete the low speed forward drive power train when the driven shaft of the transmission tends to rotate faster than it can be driven through the low speed train either due to coasting conditions of the vehicle or else due to power transmitted through the intermediate speed train, due to the overrunning action of the one-way device 39 in series with the brakes 17; and under these conditions, the drum 48 tends to rotate in the forward direction (opposite to the direction indicated by the arrow 48a) so that the band 47 unwraps on the drum as has been above mentioned. Furthermore, the reduced pressure from the conduit 167 is supplied to the low brake servo-motor 61 causing an engagement of the low brake 18 with a less intensity than for completing the low speed forward drive power train in the low range position of the selector valve piston 137. For these three reasons, the low brake 18 and the low speed forward power train completed thereby under these conditions functions to provide only a light holding force preventing creeping of the vehicle, and the moment that the vehicle accelerator is depressed to open the engine throttle, the low brake band 47 slips with ease on its drum 48 and permits an initial forward drive of the vehicle through the intermediate speed forward drive power train with a minimum of restraint. When movement of the vehicle actually begins, the anti-creep valve 87 then functions to completely disengage the low brake 18 as has been described.

The secondary selector valve 231 in the "N", "L", or "R" positions of the selector valve piston 137 connects the ports 237 and 238 in the conduit 166 by means of the grooves between the lands 233, 234 and 235, and the conduit 166 is supplied with fluid or is drained through the selector valve 82 for these positions of the selector valve piston 137 the same as in the FIG. 1 embodiment of the invention. Since the lands 142a on the selector valve piston 137 is elongated with respect to the land 142 on the piston 137 in the FIG. 1 embodiment, reduced fluid pressure from the conduit 167 is not supplied to the anti-creep valve 87 nor can there be flow of fluid in the opposite direction through the anti-creep valve 87 for the "L" position of the selector valve piston 137.

The FIG. 5 embodiment of the invention advantageously completes both the low and intermediate speed forward drive power trains through the transmission when the selector valve piston 137 is in its "D" or drive range position for preventing a creeping of the vehicle. The anti-creep valve 87 breaks the low speed forward drive power train when vehicle movement is begun, and the low brake 18 completing the low speed forward drive power train provides a minimum of drag on forward movement of the vehicle from a drive through the intermediate power train for the three reasons mentioned specifically above.

I wish it to be understood that the invention is not to be limited to the specific constructions and arrangements shown and described, except only insofar as the claims may be so limited, as it will be apparent to those skilled in the art that changes may be made without departing from the principles of the invention.

I claim:

1. In transmission mechanism for an automotive vehicle having a driving engine, the combination of a drive shaft adapted to be driven by the vehicle engine, a driven shaft, a hydrodynamic coupling device connected with said drive shaft to be driven thereby, means for completing a power train between said hydrodynamic device and said driven shaft, and means for temporarily holding said driven shaft from rotation due to torque transmitted through said hydrodynamic device and said power train at vehicle engine idling speeds and including means for simultaneously completing another different power train between said hydrodynamic device and said driven shaft, said last named means including a wrapping friction brake for completing said last named power train when engaged and arranged to be unwrapping or self-deenergizing for the drive of said driven shaft provided by said first named power train.

2. In transmission mechanism for an automotive vehicle having a driving engine, the combination of a drive shaft adapted to be driven by the vehicle engine, a driven shaft, a hydrodynamic coupling device connected with said drive shaft to be driven thereby, means for completing a first power train between said hydrodynamic device and said driven shaft for driving the latter shaft from said hydrodynamic device, means for completing a second power train between said hydrodynamic device and said driven shaft for driving the latter shaft from said hydrodynamic device and including two friction engaging mechanisms each completing the power train and augmenting the action of the other, and means for temporarily holding said driven shaft from rotation due to torque transmitted through said hydrodynamic device and said first power train at vehicle engine idling speeds and including means for simultaneously completing said second power train with an application of only one of said friction engaging mechanisms for allowing a facile disengagement of said last named friction engaging mechanism when a driven is begun through said first power train.

3. In transmission mechanism for an automotive vehicle having a driving engine, the combination of a drive shaft adapted to be driven by the vehicle engine, a driven shaft, a hydrodynamic coupling device driven by said drive shaft, means for providing a first power train between said hydrodynamic device and said driven shaft for driving the latter shaft from the hydrodynamic device, means for providing a second power train between said hydrodynamic device and said driven shaft for driving the driven shaft from said hydrodynamic device, said last named means including a friction engaging mechanism engaged with a certain pressure for completing said second power train for driving the driven shaft through this power train, and means for temporarily holding said driven shaft from rotation due to torque transmitted through said hydrodynamic device and said first power train at vehicle engine idling speeds and including means for engaging said friction engaging mechanism to complete said second power train simultaneously with engagement of said first power train and with a pressure less than that utilized for driving said driven shaft through said second power train so that said friction mechanism may facilely slip when drive is begun through said first power train.

4. In transmission mechanism for an automotive vehicle having a driving engine, the combination of a drive shaft adapted to be driven by the vehicle engine, a driven shaft, a hydrodynamic coupling device driven by said drive shaft, means for completing a high speed forward drive power train between said hydrodynamic device and said driven shaft, means for temporarily holding said driven shaft from rotation due to torque transmitted through said hydrodynamic device and power train at vehicle engine idling speeds and including means for simultaneously completing a low speed forward drive power train between said hydrodynamic device and said driven shaft, and means responsive to the speed of said driven shaft for maintaining said driven shaft holding means ineffective until the speed of said driven shaft decreases below a predetermined speed.

5. In transmission mechanism for an automotive vehicle having a driving engine, the combination of a drive shaft adapted to be driven by the vehicle engine, a driven shaft, a hydrodynamic coupling device driven by said drive shaft, means for providing a high speed forward drive power train between said hydrodynamic device and said driven shaft and including a friction engaging mechanism for completing the power train when engaged, means for providing a low speed forward drive power train between said hydrodynamic device and said driven shaft and including planetary gearing and two friction brakes for the gearing each of which completes the power train and each of which augments the other for driving the driven shaft through this power train and which are engaged with a predetermined pressure for this purpose, and means for temporarily holding said driven shaft from rotation due to torque transmitted through said hydrodynamic device and said high speed forward drive power train at vehicle engine idling speeds and including means for engaging one of said friction brakes to complete said low speed forward drive power train simultaneously with engagement of said friction mechanism for said high speed forward drive and with a pressure less than said pressure utilized for driving said driven shaft through said low speed forward drive power train, said last mentioned friction brake being unwrapping or self-deenergizing for the high speed drive whereby to facilely disengage when said driven shaft begins to rotate due to power transmitted through said high speed drive power train.

6. In transmission mechanism for an automotive vehicle having a driving engine, the combination of a drive shaft adapted to be driven by the vehicle engine, a driven shaft, a hydrodynamic coupling device driven by said drive shaft, means for providing a forward drive power train between said hydrodynamic device and said driven shaft and including a friction engaging mechanism for completing the power train when engaged, means for providing a reverse drive power train between said hydrodynamic device and said driven shaft and including a friction engaging mechanism for completing the power train when engaged, a source of power, means including a control device for connecting said source of power and said first and said second friction engaging mechanisms for engaging the two mechanisms and simultaneously completing the two power trains when said control device is actuated for holding said driven shaft from rotation due to torque transmitted through said hydrodynamic device and the forward drive power train at vehicle engine idling speeds, and power reducing means for rendering the application of power on said second friction engaging mechanism less than said first friction engaging mechanism when said two mechanisms are engaged as aforesaid so that said forward drive power train may be effective to drive said driven shaft with a slippage of said second friction engaging mechanism above vehicle engine idling speeds.

7. In transmission mechanism for an automotive vehicle having a driving engine, the combination of a drive shaft, a driven shaft, a hydrodynamic coupling device connected with said drive shaft to be driven thereby, means for completing a power train between said hydrodynamic device and said driven shaft and including a first fluid pressure operated friction engaging means for completing the power train, a source of a predetermined high fluid pressure connectible with said first friction engaging means for engaging it, a source of a predetermined low fluid pressure connected with said hydrodynamic coupling device for charging the hydrodynamic device, means for completing a second power train between said hydrodynamic device and said driven shaft and including a second fluid pressure operated friction engaging means for completing the power train, and means for connecting said second friction engaging means with said low pressure source whereby said second friction engaging means slips to allow said driven shaft to be driven through said first-named power train above vehicle engine idling speeds.

References Cited in the file of this patent

UNITED STATES PATENTS

| | | |
|---|---|---|
| 1,673,863 | Brown | June 19, 1928 |
| 2,080,067 | Stucatur | May 11, 1937 |
| 2,195,605 | Thompson | Apr. 2, 1940 |
| 2,221,393 | Carnegie | Nov. 12, 1940 |
| 2,528,584 | Farkas | Nov. 7, 1950 |
| 2,549,125 | Paton | Apr. 17, 1951 |
| 2,566,518 | Farkas | Sept. 4, 1951 |
| 2,658,592 | Polomski | Nov. 10, 1953 |
| 2,682,787 | Holdeman | July 6, 1954 |

OTHER REFERENCES

Automotive Industries, Aug. 15, 1950, page 46 and pages 102 to 110. (Copy in Division 12.)